(12) United States Patent
Cain

(10) Patent No.: US 6,350,051 B1
(45) Date of Patent: Feb. 26, 2002

(54) HOPPER ASSEMBLY FOR A CEMENT TRUCK

(75) Inventor: Matthew Cain, Charlotte, MI (US)

(73) Assignee: Builders' Redi-Mix, Inc., Lansing, MI (US)

( * ) Notice: Subject to any disclaimer, the term of this patent is extended or adjusted under 35 U.S.C. 154(b) by 0 days.

(21) Appl. No.: 09/498,406

(22) Filed: Feb. 4, 2000

Related U.S. Application Data

(60) Provisional application No. 60/118,594, filed on Feb. 4, 1999.

(51) Int. Cl.$^7$ ................................................. B28C 7/04
(52) U.S. Cl. ............................. 366/41; 366/68; 193/10
(58) Field of Search ........................ 366/41, 53–61, 366/68, 220, 225, 227, 228; 193/10, 14, 15, 17

(56) References Cited

U.S. PATENT DOCUMENTS

| 899,414 | A | * | 9/1908 | Koehring |
| 1,821,056 | A |   | 9/1931 | Durham |
| 1,946,222 | A | * | 2/1934 | Mandt |
| 2,265,751 | A |   | 12/1941 | Ball |
| 2,316,137 | A |   | 4/1943 | Visser |
| 2,395,571 | A | * | 2/1946 | McMillan |
| 2,501,944 | A |   | 3/1950 | Jaeger et al. |
| 2,589,492 | A |   | 3/1952 | Graham |
| 2,750,164 | A |   | 6/1956 | MacKinney |
| 2,880,977 | A | * | 4/1959 | Maxon, Jr. |
| 2,904,318 | A |   | 9/1959 | Broberg |
| 2,997,213 | A |   | 8/1961 | Richards et al. |
| 3,061,063 | A | * | 10/1962 | Rutten |
| 3,131,913 | A |   | 5/1964 | Swarthout |
| 4,009,868 | A | * | 3/1977 | Blind |
| 4,154,534 | A | * | 5/1979 | Lawrence et al. ............. 366/59 |
| 4,318,621 | A | * | 3/1982 | Lawrence et al. ............. 366/59 |
| 4,428,677 | A | * | 1/1984 | Schreiter, Jr. ................ 366/41 |
| 4,498,568 | A | * | 2/1985 | Christenson ................. 193/10 |
| 5,154,488 | A |   | 10/1992 | Maxon, III |
| 5,884,998 | A | * | 3/1999 | Silbernagel .................. 366/41 |

FOREIGN PATENT DOCUMENTS

SU          1537543    *  1/1990

* cited by examiner

Primary Examiner—Charles E. Cooley
(74) Attorney, Agent, or Firm—Howard & Howard

(57) ABSTRACT

A hopper assembly for a ready mixed concrete truck having a material off loading position and a material on loading position. The hopper assembly includes a main chute portion and a movable portion movable between an open position for off loading and a closed position for on loading. The movable portion directs material directly into an opening of a mixing drum providing for the rapid on loading from an overhead delivery apparatus when in the closed position. When the movable portion is in the open position or off loading position a passage area between the hopper assembly and the mixing drum is increased thereby eliminating a restricted area to provide for the effective dispensing of high viscosity material such as low slump concrete.

14 Claims, 12 Drawing Sheets

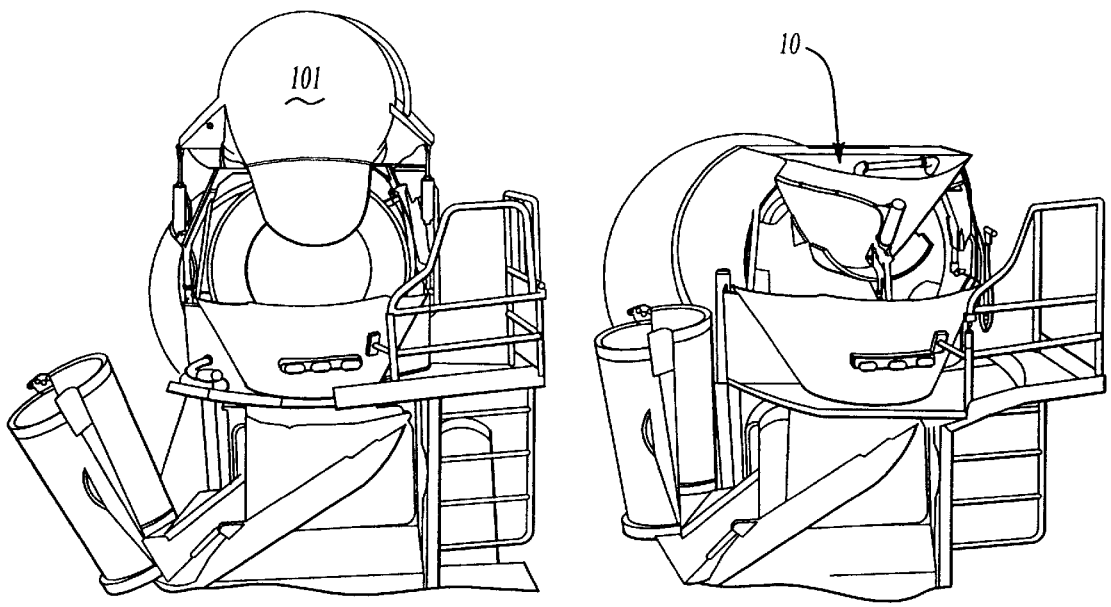
Fig-5A
*PRIOR ART*
Fig-5B
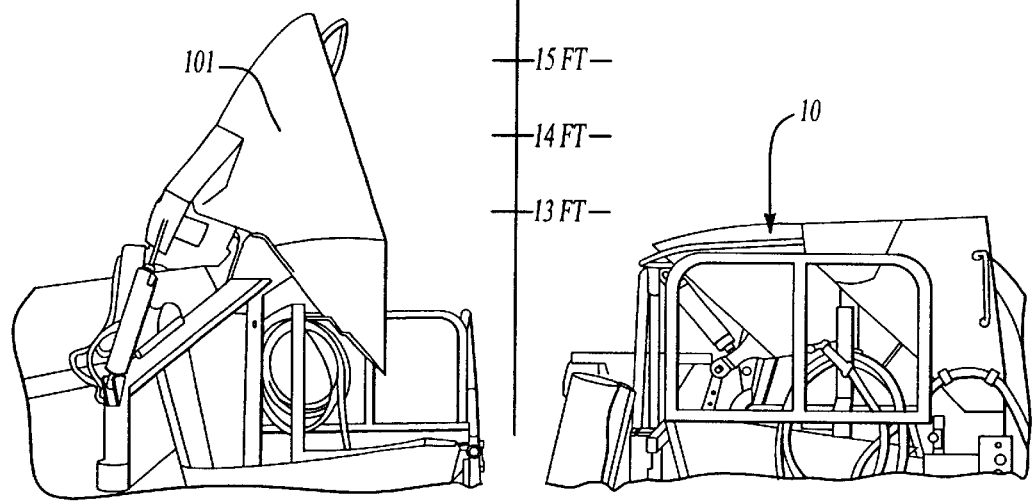
Fig-6A
*PRIOR ART*
Fig-6B

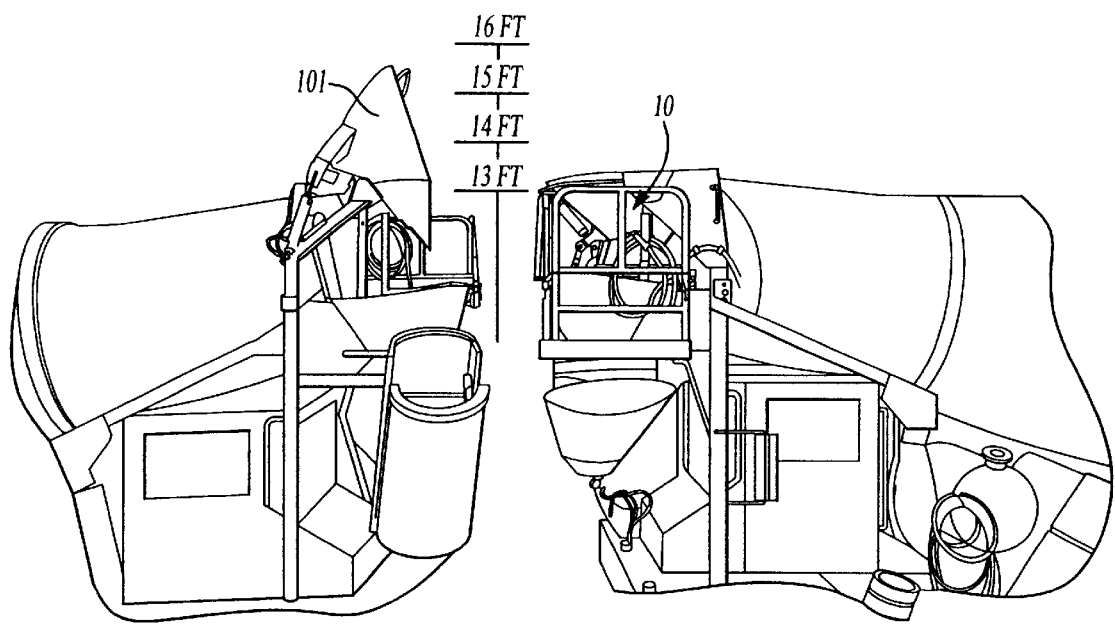
Fig-7A
*PRIOR ART*
Fig-7B
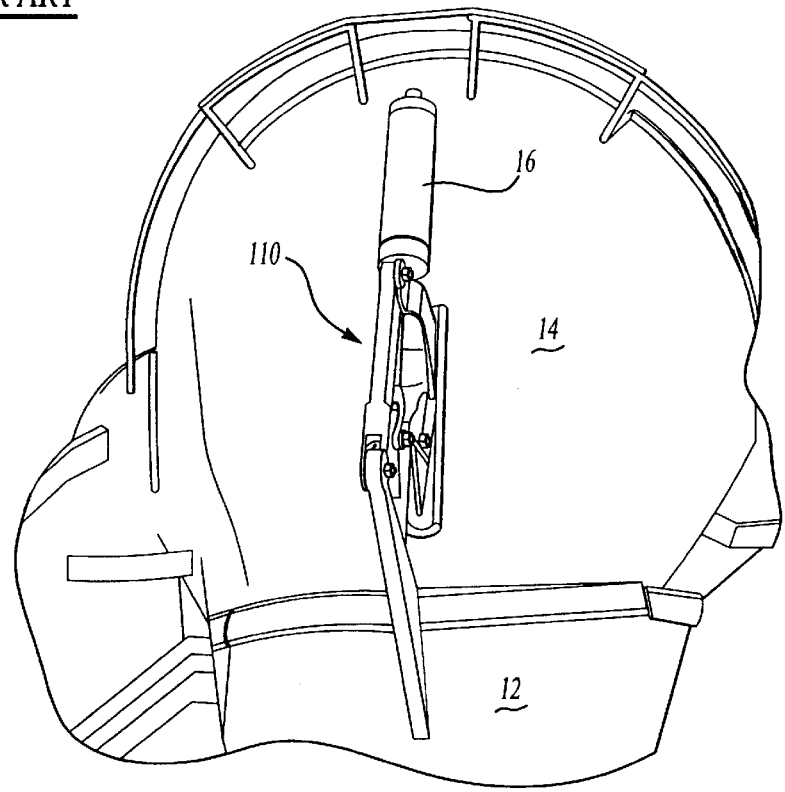
Fig-8

HOPPER ASSEMBLY FOR A CEMENT TRUCK

This application claims the benefit of U.S. Provisional No. 60/118,594, filed Feb. 4, 1999.

BACKGROUND OF THE INVENTION

The present invention generally relates to a loading hopper for a ready mixed concrete truck, and more particularly to a loading hopper having a movable portion which eliminates restrictions during the off loading of concrete.

Ready mixed concrete trucks currently receive the various materials that make up concrete through an overhead delivery system. The truck is located under a delivery chute and the materials are loaded directly into a mixing drum on the truck. The materials are commonly directed into an opening in the mixing drum of the truck by a hopper located adjacent to the mixing drum. The hopper is generally a funnel shaped device extending into an open angularly raised portion of the mixing drum. The hopper is thus located to direct the downward pouring material directly into the angled mixing drum.

Concrete is provided in various mixes dependent upon the intended use. To form curbs, gutters, and the like, a thick concrete having a particularly high viscosity is normally employed. This type of concrete is commonly referred to as low slump concrete as it retains the shape in which it is poured. To form a curb the low slump concrete is dispensed from the mixing drum into a slipform machine. A slipform machine is a self-propelled, tracked machine, which continuously molds low slump concrete into various freestanding dimensions without the use of stationary forms. The ready mix concrete truck moves along with the slipform machine to discharge the concrete into the slipform machine.

Unfortunately, the thickness of the low slump concrete, which makes it so effective in the formation of curbs, creates particular difficulties during the dispensing process. The component materials and the concrete are commonly on loaded and off loaded from the mixing drum through the same opening in the mixing drum and thus the hopper is located adjacent the mixing drum opening. This is normally acceptable when using a concrete having a standard viscosity as the mixing drum opening and the hopper are spaced to allow passage of the concrete from the mixing drum to the dispensing apparatus. Nonetheless, the low slump concrete viscosity prevents effective off loading from the restricted area between the hopper and mixing drum opening, thus slowing down the unloading process.

When the low slump concrete becomes restricted during the off loading process, the truck cannot discharge at a rate comparable to the ability of the slipform machine. Due to this, the slipform machine has to be repeatedly stopped to allow the truck to catch up with product delivery. This disrupts the smooth continuous operation of the slipform machine resulting in an increase of manual repair to the finished product (curb, barrier wall etc.).

To avoid the restriction problem, another expedient solution is commonly performed. The entire traditional hopper assembly is commonly hinged to the mixing drum and can be raised by pneumatic or hydraulic cylinders during cleaning or maintenance. The entire hopper assembly is thus commonly raised during the off loading process to completely eliminate interference with the low slump concrete off loading (FIGS. 4A, 5A, and 6A prior art). However, commonly known hopper assemblies are manufactured as one-piece funnel shaped structures, which can weigh several hundred pounds. This creates the danger that the entire hopper assembly could fall if pneumatic or hydraulic pressure is lost and thus injure a closely located individual. In addition, when the hopper assembly is raised, the overall vehicle height is increased by up to three feet. The increased height thus prevents the truck from passing under standard clearance height objects such as bridges and power lines, which further restricts the curb laying process.

SUMMARY OF THE INVENTION

The present invention provides a hopper assembly, which solves the above disadvantages while further improving the serviceability and effectiveness of a ready mixed concrete truck during the dispensing of low slump concrete.

The present invention also provides a hopper assembly having a main chute portion and a movable portion located adjacent to a storage container such as a ready mixed concrete truck mixing drum. The movable portion is attached to the main chute assembly and is moveable between an open position and a closed position, which corresponds to a material off loading position and a material on loading position, respectively.

The hopper assembly of the present invention further includes an actuator to move the movable portion between the material off loading position and the material on loading position. The actuator preferably is a pneumatic or hydraulic cylinder attached to the main chute portion which actuates the movable portion through a linkage assembly to move the movable portion between a closed position and the open position away from the mixing drum.

To provide the rapid on loading from an overhead delivery apparatus, the movable portion is moved to the material on loading position. The hopper assembly is therefore configured to direct material into an opening of the mixing drum. For the effective dispensing of high viscosity material such as low slump concrete the movable portion is moved to the off loading position. A passage area between the hopper assembly and the mixing drum is thereby increased and the restriction between the hopper assembly and the mixing drum is eliminated.

BRIEF DESCRIPTION OF THE DRAWINGS

Other advantages of the present invention will be readily appreciated, as the same becomes better understood by reference to the following detailed description when considered in connection with the accompanying drawings wherein:

FIG. 5A is another front pictorial illustration of the height of the hopper assembly of the prior art hopper assembly in the open position;

FIG. 5B is another front pictorial illustration of the height of the hopper assembly of the present invention in the open position;

FIG. 6A is a close-up side pictorial illustration showing the height above ground of the hopper assembly of the prior art hopper assembly in the open position;

FIG. 6B is a close-up side pictorial illustration showing the height above ground of the hopper assembly of the present invention in the open position;

FIG. 7A is another side pictorial illustration of the height of the hopper assembly of the prior art hopper assembly in the open position;

FIG. 7B is another side pictorial illustration of the height of the hopper assembly of the present invention in the open position;

FIG. 8 is a pictorial illustration of the hopper assembly of the present invention in a closed position;

DETAILED DESCRIPTION OF THE PREFERRED EMBODIMENT

Figure 1A:
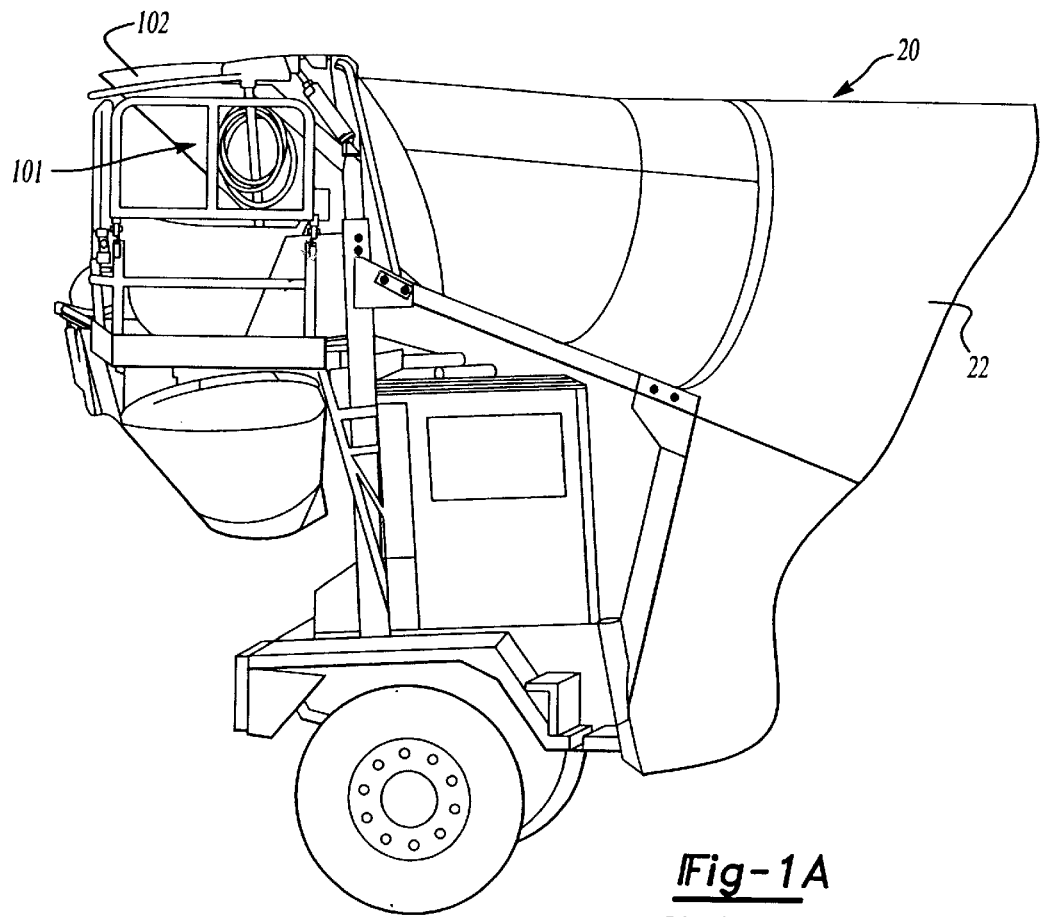
FIG. 1A is a pictorial illustration of a standard front discharge concrete mixer truck including a prior art hopper assembly.

A traditional hopper assembly 101 for a vehicle such as a concrete truck 20 is generally shown at a closed position in FIG. 1A. The hopper assembly 101 includes a main chute assembly 102 located adjacent to a mixing drum 22. The hopper assembly 101 is commonly of a funnel-like shape which extends into the mixing drum 22. The mixing drum 22 is here shown installed on a front loading ready mixed concrete truck 20. However one skilled in the art will realize that the present invention can be used on all manner of cement trucks including front and rear loading configurations.

Figure 1B:
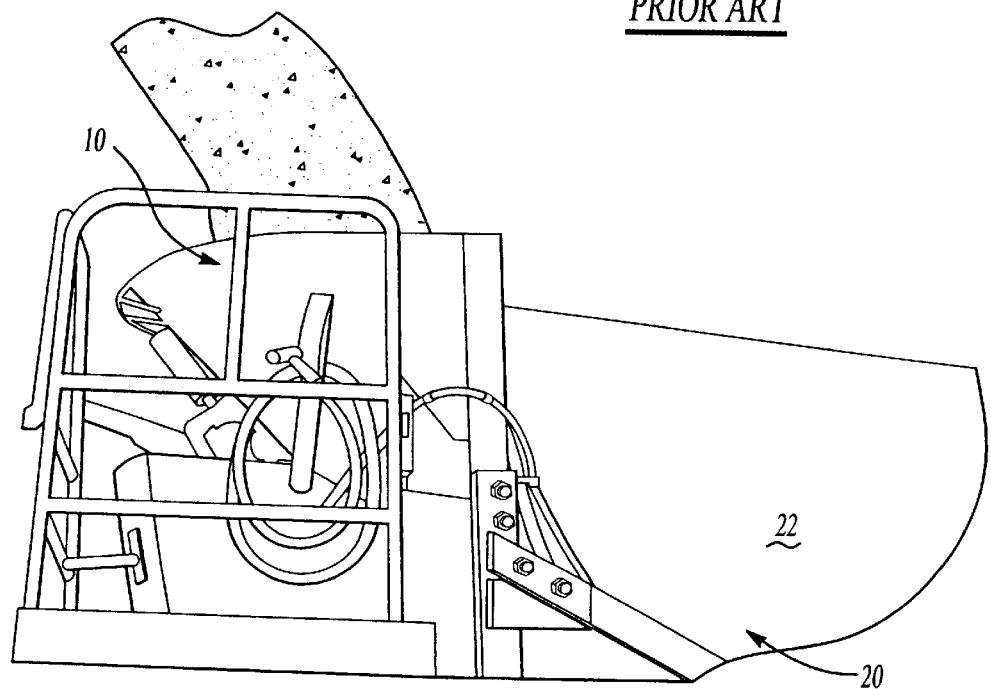
FIG. 1B is a pictorial illustration of a front discharge concrete mixer truck on loading concrete through a hopper assembly designed in accordance with the present invention in the closed position.

FIG. 1B illustrates a front loading cement truck 20 having a hopper assembly 10 designed in accordance with the present invention during the material on loading process. As illustrated the material is commonly poured from an overhead manufacturing/storage area directly through the hopper assembly 10 into the mixing drum 22. The hopper assembly 10 must withstand the force associated with the on loading process and is thus of a significant construction. A hopper assembly 10 or 101 will normally weigh several hundred pounds and, in the prior art, is affixed to the mixing drum 22 by hydraulic or pneumatic actuators which allow articulation of the entire hopper assembly 101 to an open position (FIGS. 4A, 5A and 6A) for cleaning and maintenance.

Figure 2A:
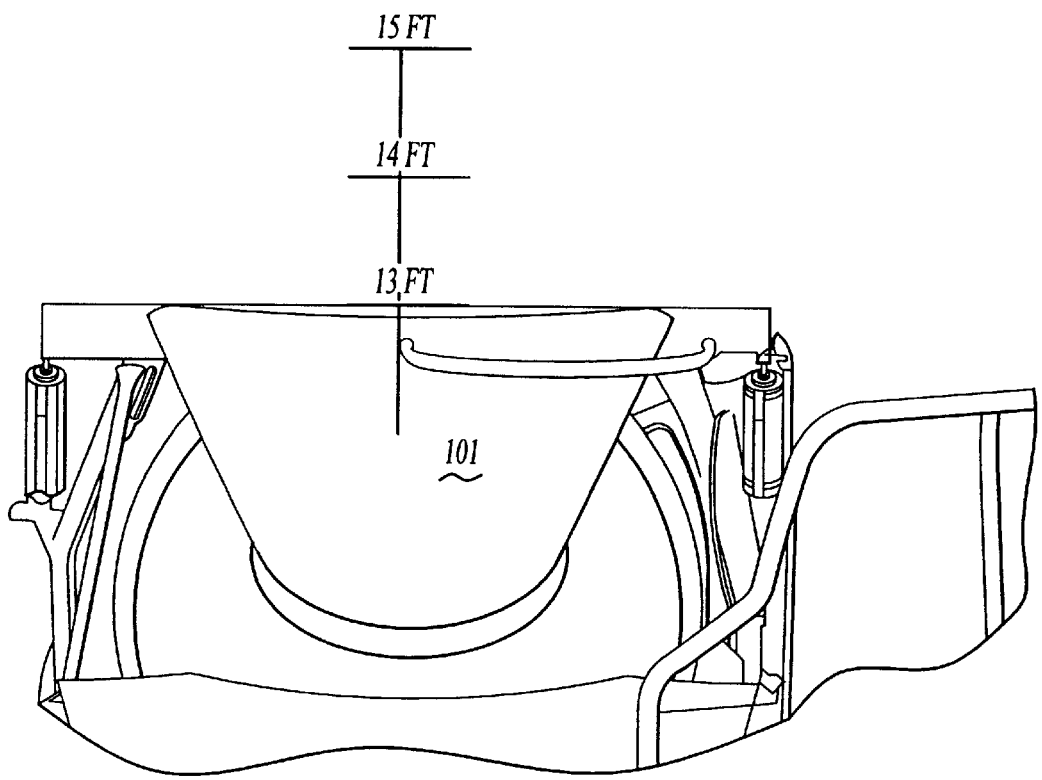
FIG. 2A is a front pictorial illustration of the prior art hopper assembly in a closed position.
Figure 2B:
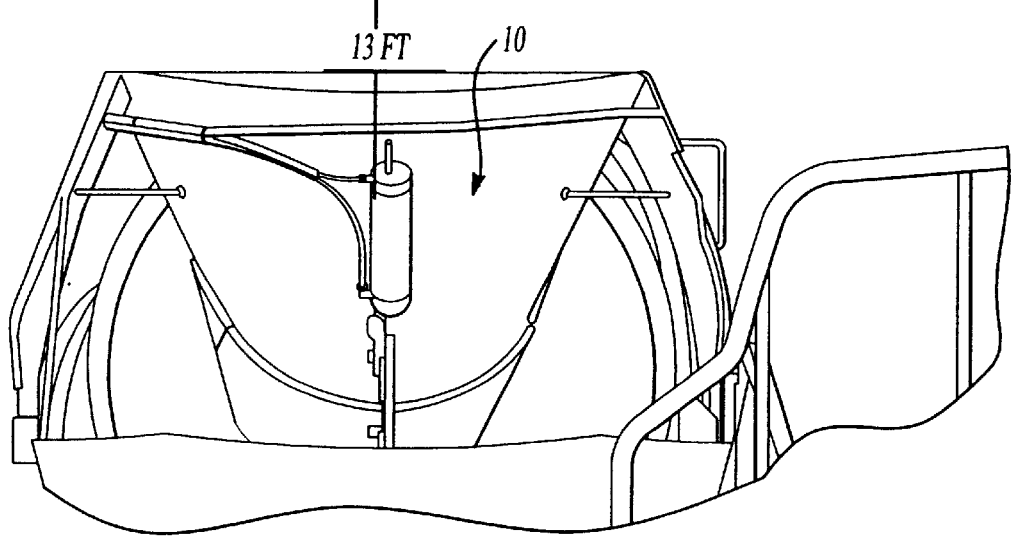
FIG. 2B is a front pictorial illustration of the hopper assembly of the present invention in a closed position.

FIG. 2A illustrates a prior art hopper assembly 101 in the closed or on loading position. The prior art hopper assembly 101 is illustrated as having a vertical height of thirteen feet above the ground in this position. FIG. 2B illustrates the hopper assembly 10 of the present invention. It is apparent that the vertical height of the hopper assembly 10 is maintained at thirteen feet above the ground.

Figure 3A:
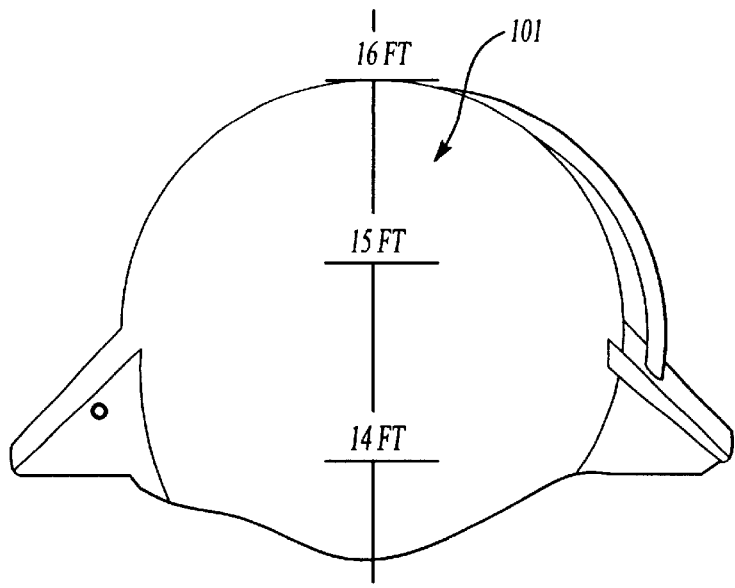
FIG. 3A is a front pictorial illustration of the prior art hopper assembly in an open position.
Figure 4A:
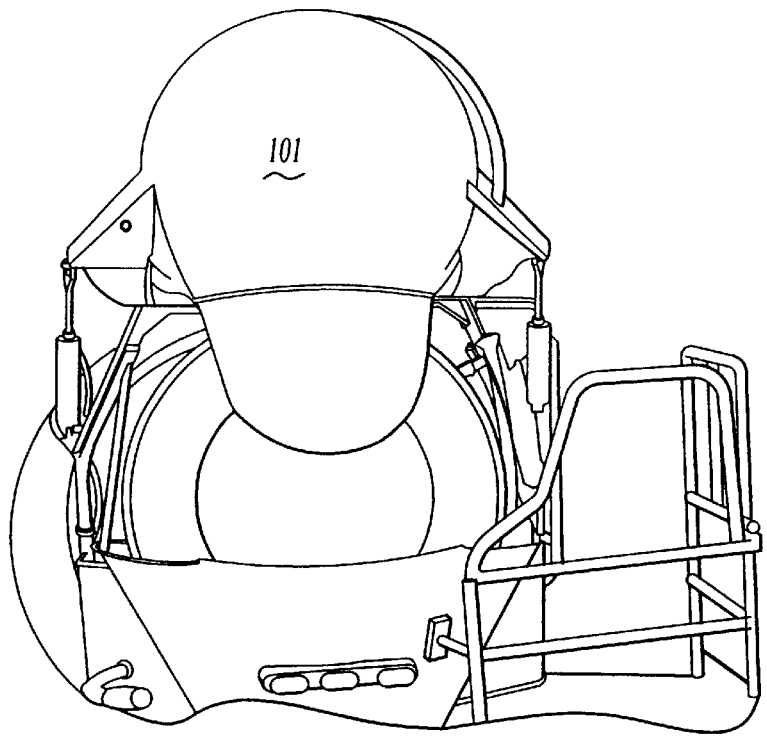
FIG. 4A is another front pictorial illustration of the prior art hopper assembly in the open position.

FIGS. 3A and 4A illustrate the one-piece prior art hopper assembly 101, which is shown in the open position, as having a vertical height of approximately sixteen feet when in this position. This open position is sometimes used during a curb laying operation to prevent off loading restriction caused by the high viscosity low slump concrete becoming trapped between the mixing drum 22 and the hopper assembly 101. In addition, it is readily apparent that the approximately sixteen feet height has the potential to interfere with standard clearance obstacles such as bridges and power lines, which are generally set at 13.5 feet above ground. Moreover, if the actuators were to fail, the entire prior art hopper assembly 101 could fall down to the closed position possibly causing damage or injury. The open position is also used for cleaning operations, wherein an operator stands below the raised hopper assembly 101 to clean the adjacent areas of the concrete truck 20.

Figure 3B:
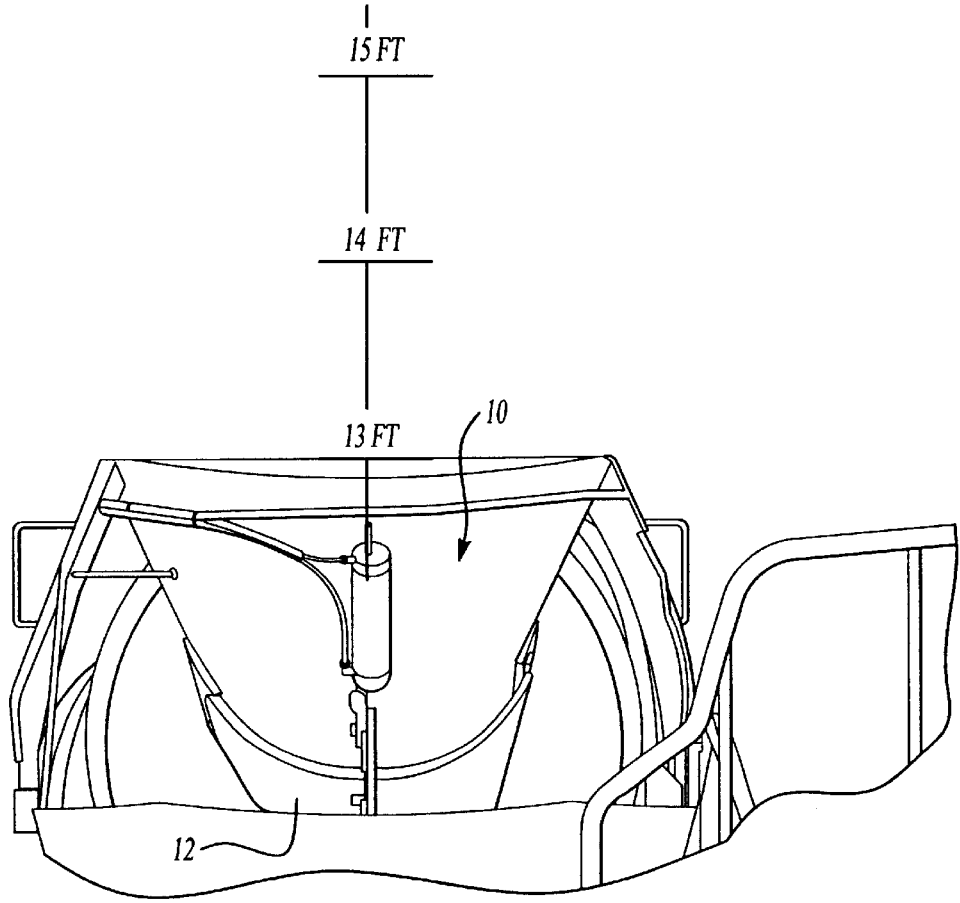
FIG. 3B is a front pictorial illustration of the hopper assembly of the present invention in an open position.
Figure 4B:
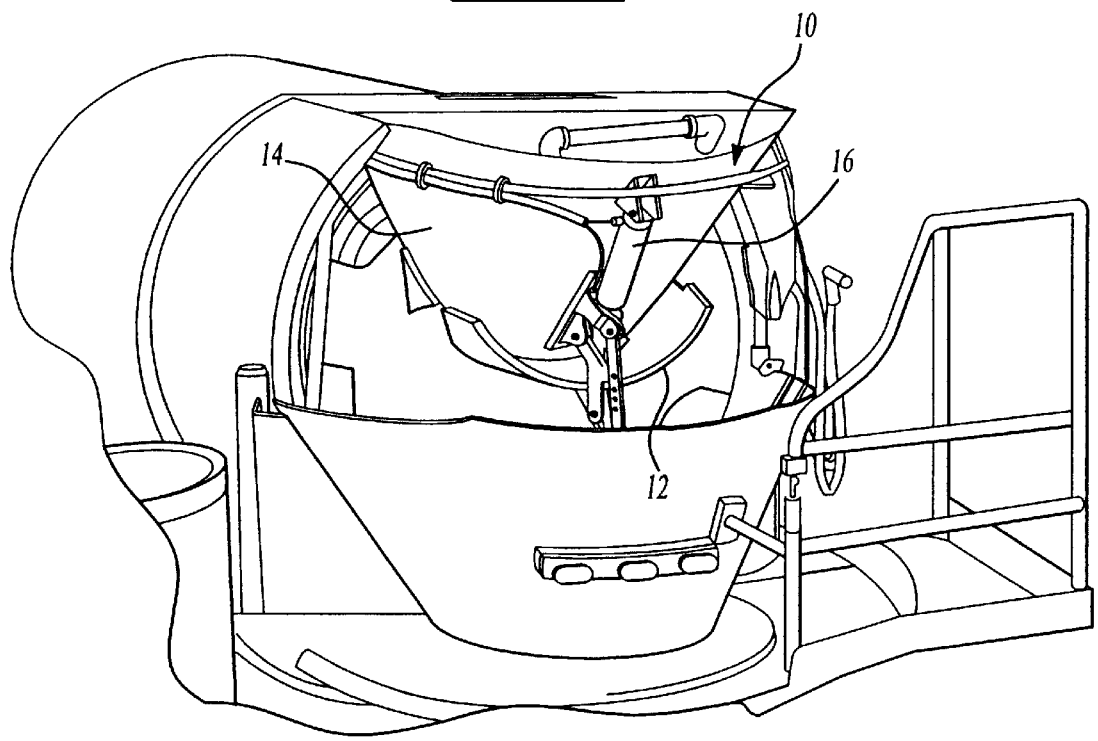
FIG. 4B is another front pictorial illustration of the hopper assembly of the present invention in the open position.

FIGS. 3B and 4B illustrate the present invention hopper assembly 10 in an open or off loading position, such as when dispensing low slump concrete while maintaining an overall vertical height of approximately thirteen feet as a movable portion 12 no longer depends upon movement of the entire hopper assembly 10.

FIGS. 5A–B, 6A–B, and 7A–B show side by side comparisons of the prior art hopper 101 (5A, 6A, 7A) and the hopper assembly 10 of the present invention (5B, 6B, 7B) installed on an equivalent front loading cement truck. The open position shown in FIGS. 5B, 6B and 7B would again be the orientation most commonly used during the curb laying process or cleaning process.

Figure 9:
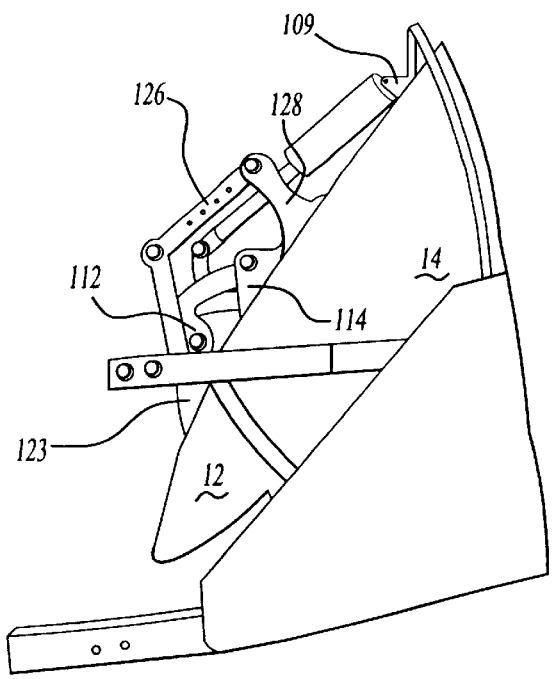
FIG. 9 is a pictorial illustration of the hopper assembly of the present invention in the closed position.

FIGS. 8 and 9 are illustrations of the hopper assembly 10 of the present invention. The movable portion 12 is attached to a main chute portion 14 and an actuator 16 is attached therebetween. The actuator 16 provides the motive power to move the movable portion 12 between an open position and a closed position in relation to the main chute portion 14. The actuator 16 is preferably a hydraulic, pneumatic, or a like cylinder attached at a first end to the main chute portion 14 at a pair of mounting ears 109. Again, this movable portion 12 no longer depends upon the movement of the entire hopper assembly 10.

The connection of moveable portion 12 to main chute portion 14 includes a linkage assembly 110 having a generally J-shaped link 112 pivotally mounted at its opposite ends to the main chute portion 14 and the moveable portion 12, respectively. As illustrated, one end of the J-shaped link 112 is pivotally mounted to main chute portion 14 by a pair of ears 114 and a pin 116. An opposite end 118 of link 112 is mounted to an arm 120. The opposite end 118 has opposed ears 122 that are mounted over arm 120 and pinned to arm 120. The ears 122 allow the opposite end 118 to pivot over arm 120 as link 112 is pivoted between the open and closed positions (see FIG. 10). As will be explained in greater detail below, the link 112 and the interaction of ears 122 pivoting over arm 120 permit a tighter closure of the moveable portion 12 with respect to main chute portion 14.

The arm 120 is illustrated with a generally triangular mounting portion 123, which in the preferred embodiment is welded to the moveable portion 12. A free end 124 of arm 120 is pivotally mounted to a connecting bracket 126 which is in turn pivotally connected to the main chute portion 14 through a pair of mounting ears 128.

A second end, opposite the first end, of the actuator 16 is pivotally mounted to link 112. As illustrated in FIGS. 10–14, the actuator 16 retracts to open the moveable portion 12. Due to the linkage assembly 110, the moveable portion 12 is first forced away from actuator 16, even though actuator 16 is pulling the J-shaped link in the opposite direction. This first movement separates an edge of the moveable portion 12 from an edge of the main chute portion 14. This downward movement is caused by the J-shaped link 112 which when pulled rotates the arm 120 down slightly.

As the J-shaped link 112 is pulled back and up by actuator 16, the moveable portion 12 slides back away from the main chute portion 14 in a direction generally parallel to the longitudinal axis of the vehicle 20. In this way, the moveable portion 12 stays up close to the main chute portion 14 out of the path of concrete being dispensed.

Figure 10:
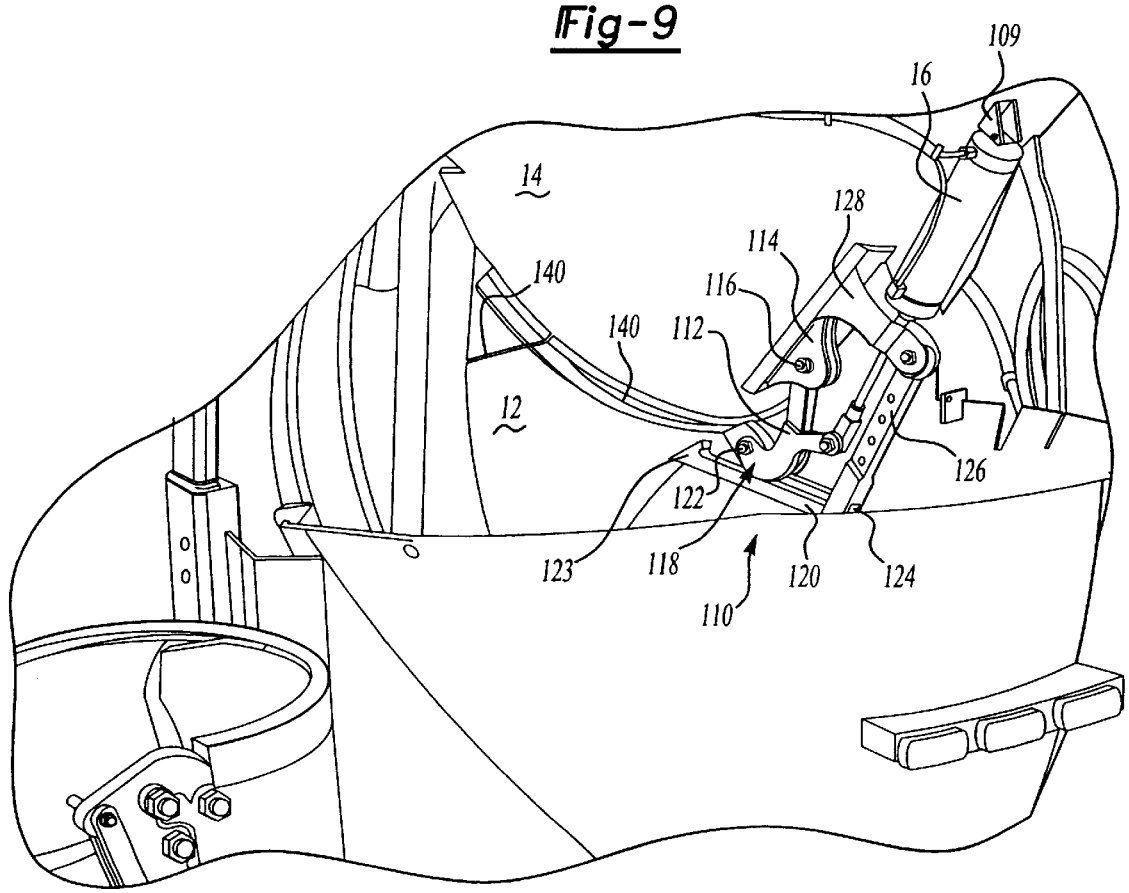
FIG. 10 is a pictorial illustration of the hopper assembly of the present invention in the closed position.

As will be appreciated by those of ordinary skill in the art, an existing truck can easily be retrofitted with a hopper assembly 10 of the present invention. With reference to FIGS. 8–10 the moveable portion 12 can be cut from a traditional main chute. The bottom portion of the chute is cut along a line 140 shown in FIG. 10. The linkage assembly 110 is then attached by welding ears 114 and 128 to main chute portion 14 and welding portion 123 to moveable portion 12. The J-shaped link 112 and connecting bracket 126 can then be assembled and actuator 16 connected to mounting ears 109 and J-shaped link 112.

Figure 11:
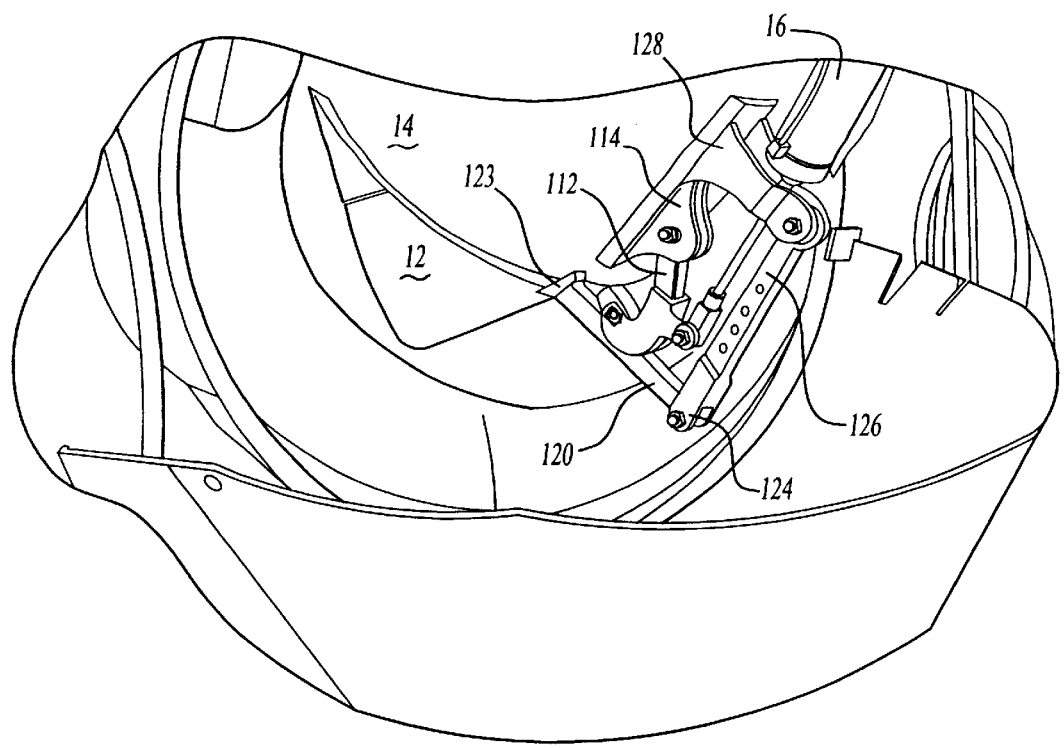
FIG. 11 is a pictorial illustration of the hopper assembly of the present invention in the closed position.

FIGS. 10 and 11 are illustrations showing the hopper assembly 10 of the present invention located adjacent the mixing drum 22. The movable portion 12 is shown in the closed position and is therefor aligned with the main chute portion 14. This closed position is the position that allows the on loading of materials in the identical process currently used in traditional trucks. Materials poured into the hopper assembly 10 are directed by the main chute portion 14 and the movable portion 12 directly into the mixing drum 22 in the known manner.

Figure 12:
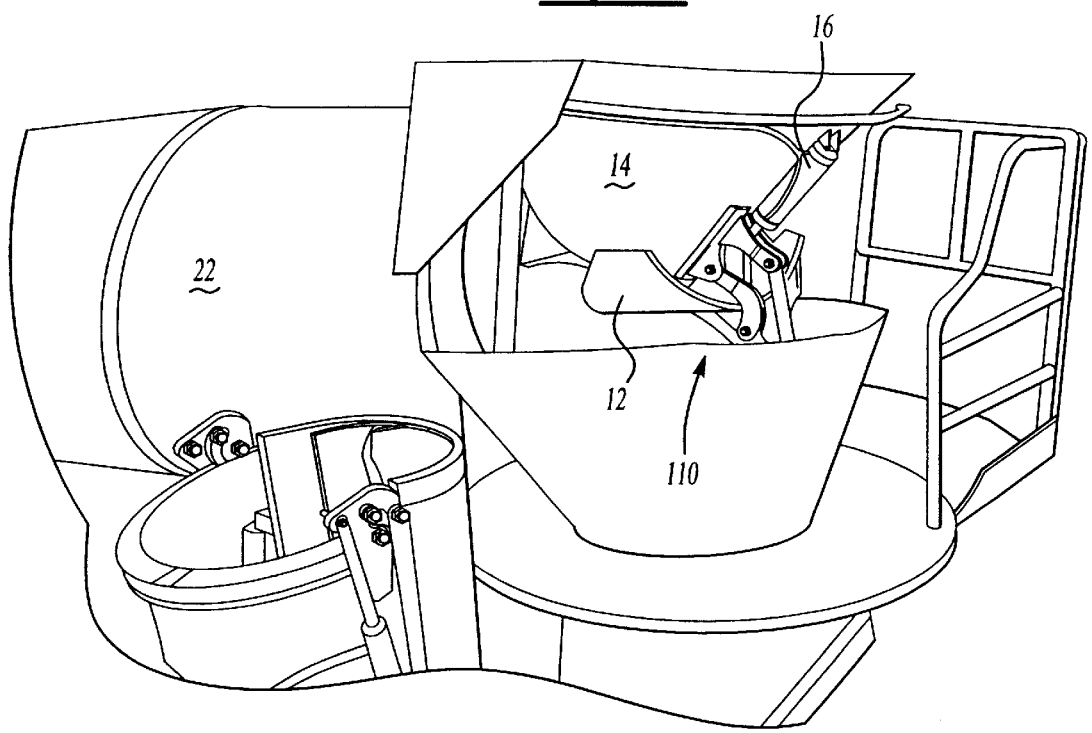
FIG. 12 is a pictorial illustration of the hopper assembly of the present invention in the open position.
Figure 13:
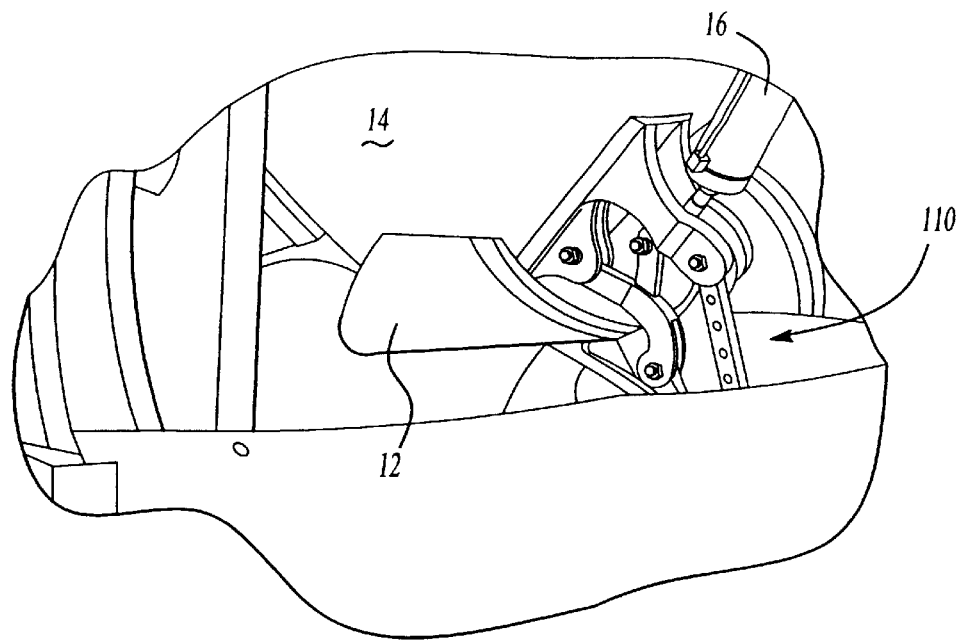
FIG. 13 is a close-up pictorial illustration of the hopper assembly of the present invention in the open position.
Figure 14:
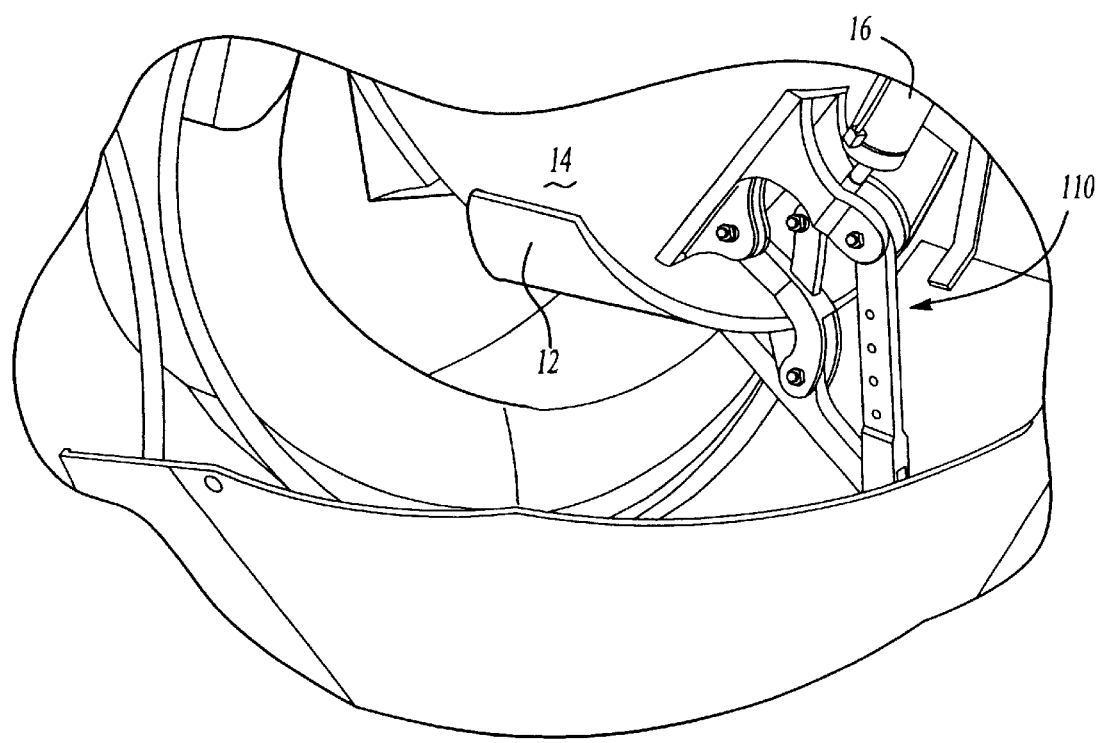
FIG. 14 is a close-up pictorial illustration of the hopper assembly of the present invention in the open position.

FIGS. 12–14 illustrate the movable portion 12 in the open position. The movable portion 12 is moved out of the mixing drum 22 and preferably pulled up and against the main chute portion 14 by the actuator 16 and associated linkage assembly 110. In this open position the movable portion 12 is not aligned with the main chute portion 14 and is generally perpendicular to the main chute portion 14. This open position provides an increased passage between the hopper assembly 10 and the mixing drum 22 allowing the ready off loading of low slump concrete.

Figure 15:
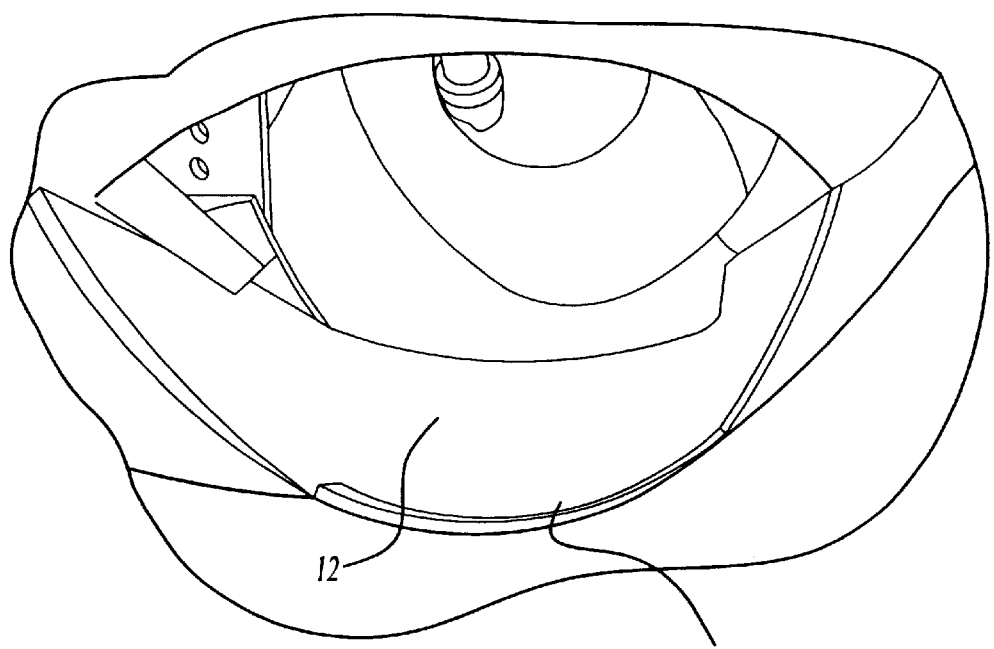
FIG. 15 is a close-up pictorial illustration looking into the hopper assembly of the present invention in the closed position.
Figure 16:
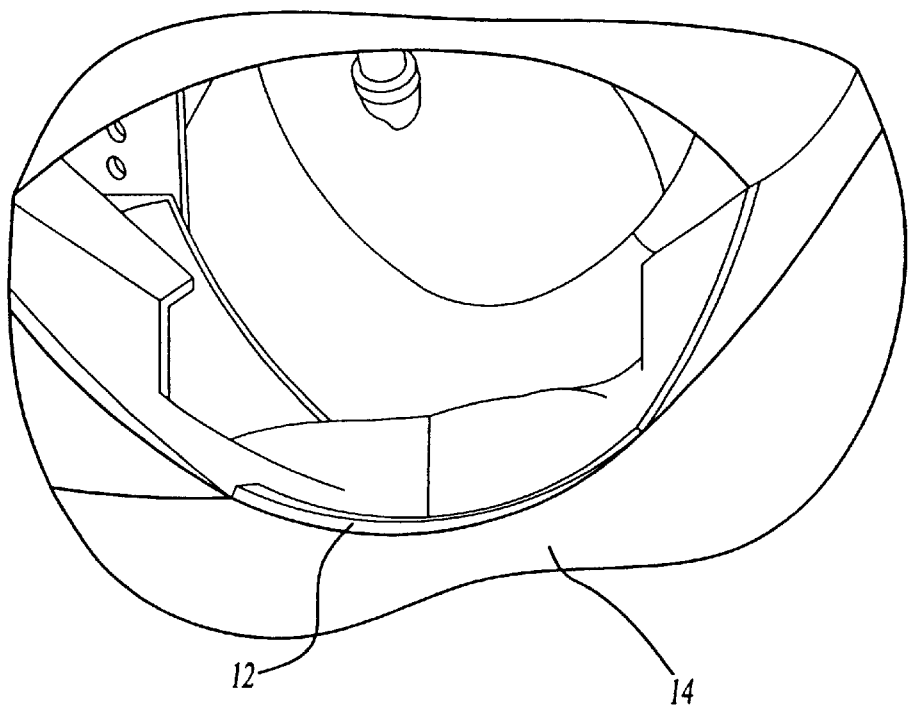
FIG. 16 is a close-up pictorial illustration looking into the hopper assembly of the present invention in the open position.
Figure 17:
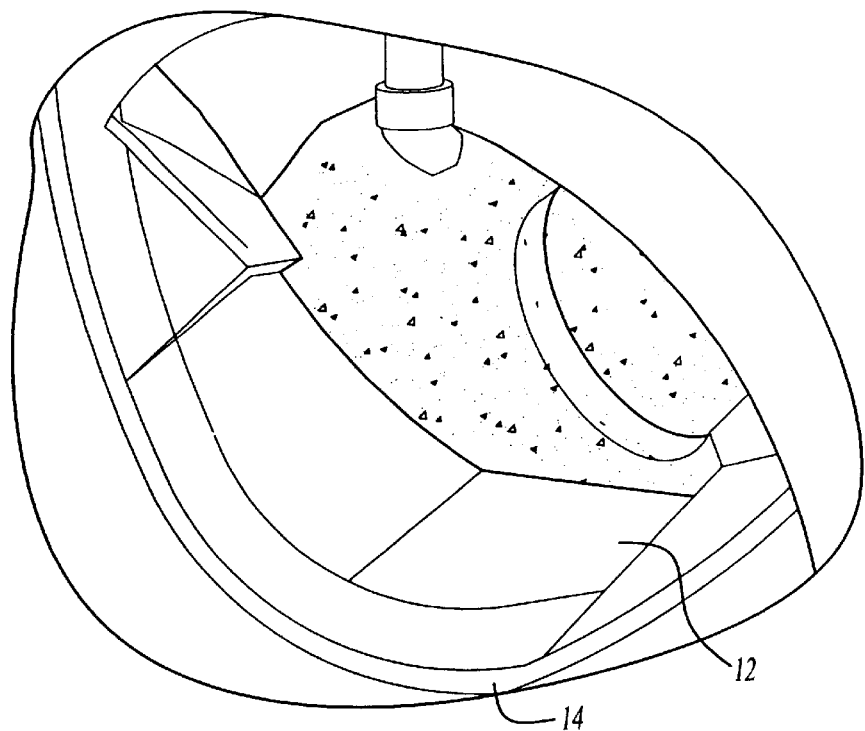
FIG. 17 is a close-up pictorial illustration looking into the hopper assembly of the present invention in the closed position while discharging concrete.
Figure 18:
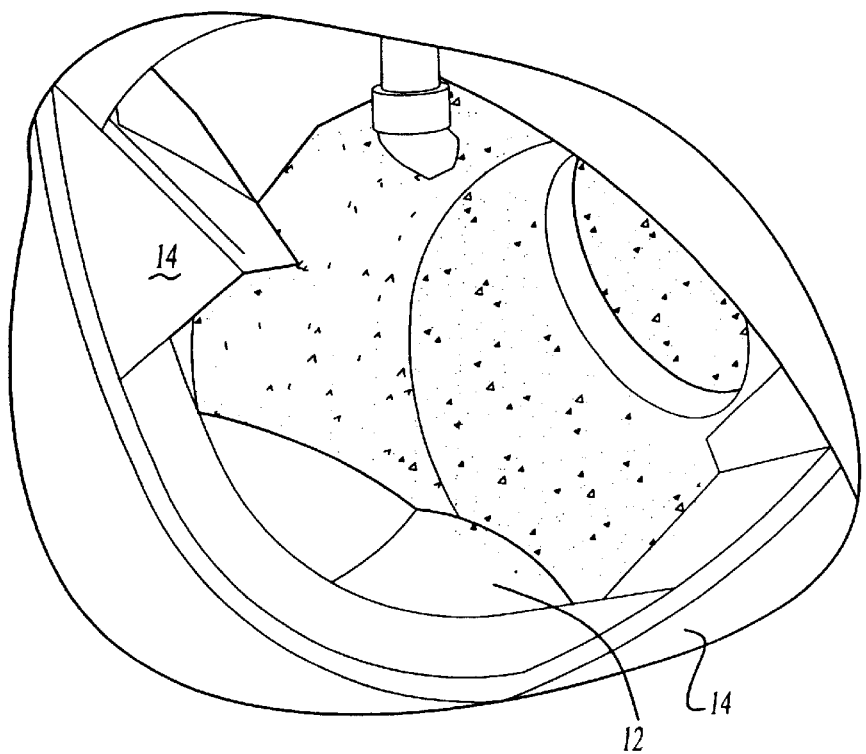
FIG. 18 is a close-up pictorial illustration looking into the hopper assembly of the present invention in the open position while discharging concrete.

FIGS. 15 and 17 illustrate a view into the hopper assembly 10 to further show the movable portion 12 in the closed position and FIGS. 16 and 18 illustrate a view into the hopper assembly 10 to further show movable portion 12 in the open position.

Figure 19:
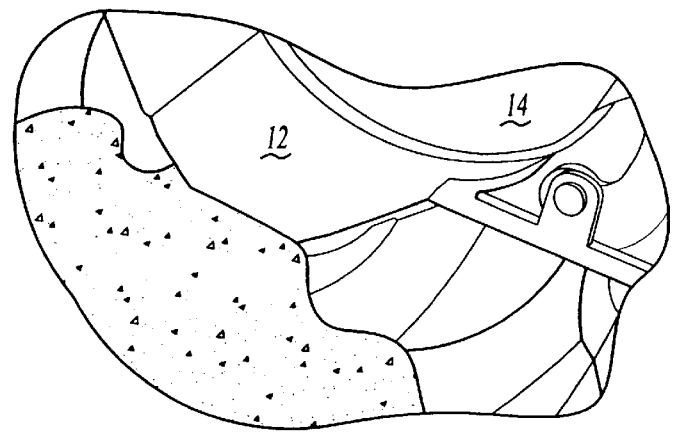
FIG. 19 is a close-up pictorial illustration looking between the mixing drum and the hopper assembly of the present invention in the closed position while discharging concrete.
Figure 20:
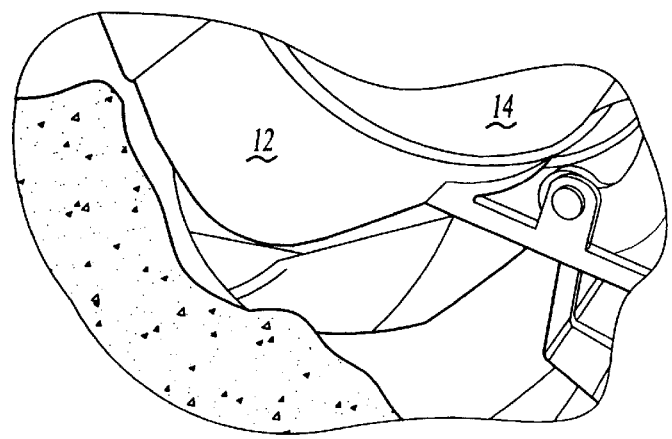
FIG. 20 is a close-up pictorial illustration looking between the mixing drum and the hopper assembly of the present invention in the closed position while discharging concrete.

FIGS. 19 and 20 show the passage area between the mixing drum 22 and the hopper assembly 10 in the closed position. The low slump concrete is shown in a first position during rotation and a second position further along in the mixing drum 22 rotation. It is clearly shown that the low slump concrete fills the passage area and the same concrete is retained in the mixing drum 22 thus increasing the off loading time.

Figure 21:
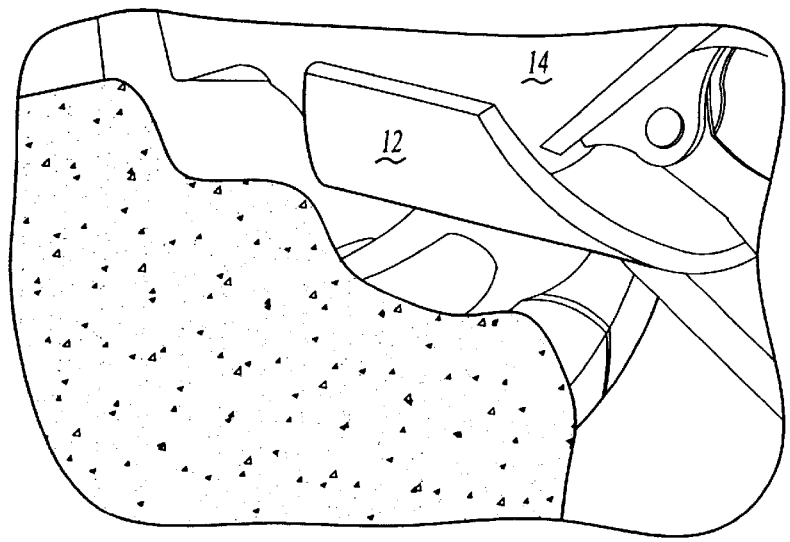
FIG. 21 is a close-up pictorial illustration looking between the mixing drum and the hopper assembly of the present invention in an open position while discharging concrete.

FIG. 21 shows the same passage area as shown in FIGS. 19 and 20 but the movable portion 12 is in the open position. The movable portion 12 is here opened and stays along the main chute portion 14 to thereby create an enlarged passage area. The open position allows the continuous dispensing of low slump cement without the disadvantages of the prior art.

The present invention has been described in an illustrative manner, and it is to be understood that the terminology, which has been used, is intended to be in the nature of words of description rather than of limitation.

Obviously, many modifications and variations of the present invention are possible in light of the above teachings. It is, therefore, to be understood that within the scope of the appended claims the invention may be practiced otherwise than as specifically described.

What is claimed is:

1. A hopper assembly for a concrete truck comprising:
   a main chute portion;
   a movable portion;
   a generally J-shaped link having a first end and a second end, said first end of said link pivotally connected to said main chute portion and said second end of said link pivotally connected to said movable portion;
   an actuator connected to said main chute portion and said movable portion, said actuator having a first end connected to said main chute portion and a second end pivotally connected to said link, actuation of said actuator rotating said link relative to said main chute portion to move said movable portion between an open position and a closed position, wherein said movable portion is aligned with said main chute portion when at said closed position and said movable portion is not aligned with said main chute portion when at said open position,
   a connecting bracket having a first end and a second end;
   an arm having a first end and a second end, wherein said first end of said arm connected to said movable portion and said second end of said arm pivotally connected to said first end of said connecting bracket, said second end of said connecting bracket pivotally connected to said main chute portion; and
   said second end of said link pivotally connected to said arm thereby pivotally connecting said link to said movable portion.

2. A hopper assembly as recited in claim 1, wherein said main chute portion includes a pair of ears and a pin, said ears and said pin pivotally connecting said first end of said link to said main chute portion.

3. A hopper assembly as recited in claim 1, wherein said first end of said arm includes a triangular mounting portion connecting said first end of said arm to said movable portion and said second end of said link is pivotally connected to said triangular mounting portion.

4. A hopper assembly as recited in claim 1, wherein said second end of said link includes a pair of opposed ears pivotally connecting said second end of said link to said arm, said ears permitting said second end of said link to pivot over said arm as said movable portion is moved between said open position and said closed position.

5. A hopper assembly as recited in claim 1, wherein said main chute portion includes a pair of mounting ears and a pin, said mounting ears and said pin pivotally mounting said second end of said connecting bracket to said main chute portion.

6. A hopper assembly as recited in claim 1, wherein said actuator comprises one of a hydraulic cylinder or a pneumatic cylinder.

7. A hopper assembly as recited in claim 6, wherein retraction of said hydraulic cylinder or said pneumatic cylinder moves said movable portion from said closed position to said open position and wherein extension of said hydraulic cylinder or said pneumatic cylinder moves said movable portion from said open position to said closed position.

8. A hopper assembly for a concrete truck comprising:

a truck;

a concrete mixing drum having an opening;

a hopper assembly attached adjacent said opening in said mixing drum, said hopper assembly including a main chute portion attached to a movable portion through a linkage assembly;

an actuator connected to said main chute portion and said movable portion, actuation of said actuator moving said movable portion relative to said main chute portion between an open position and a closed position; said movable portion being aligned with said main chute portion when at said closed position for directing material from said hopper assembly into said opening of said mixing drum and said movable portion not aligned with said main chute portion and enlarging a passage area between said hopper assembly and said mixing drum when at said open position;

said linkage assembly including a generally J-shaped link having a first end and a second end, said first end of said link pivotally connected to said main chute portion and said second end of said link pivotally connected to said movable portion;

said actuator having a first end connected to said main chute portion and a second end pivotally connected to said link, actuation of said actuator rotating said link relative to said main chute portion to move said movable portion between said open position and said closed position;

a connecting bracket having a first end and a second end, said second end of said connecting bracket pivotally connected to said main chute portion;

an arm having a first end and a second end, said first end of said arm connected to said movable portion and said second end of said arm pivotally connected to said first end of said connecting bracket; and said second end of said link pivotally connected to said arm thereby pivotally connecting said link to said movable portion.

9. A hopper assembly as recited in claim 8, wherein said main chute portion includes a pair of ears and a pin, said ears and said pin pivotally connecting said first end of said link to said main chute portion.

10. A hopper assembly as recited in claim 8, wherein said first end of said arm includes a triangular mounting portion connecting said first end of said arm to said movable portion and said second end of said link is pivotally connected to said triangular mounting portion.

11. A hopper assembly as recited in claim 8, wherein said second end of said link includes a pair of opposed ears pivotally connecting said second end of said link to said arm, said ears permitting said second end of said link to pivot over said arm as said movable portion is moved between said open position and said closed position.

12. A hopper assembly as recited in claim 8, wherein said main chute portion includes a pair of mounting ears and a pin, said mounting ears and said pin pivotally mounting said second end of said connecting bracket to said main chute portion.

13. A hopper assembly as recited in claim 8, wherein said actuator comprises one of a hydraulic cylinder or a pneumatic cylinder.

14. A hopper assembly as recited in claim 13, wherein retraction of said hydraulic cylinder or said pneumatic cylinder moves said movable portion from said closed position to said open position and wherein extension of said hydraulic cylinder or said pneumatic cylinder moves said movable portion from said open position to said closed position.

* * * * *